United States Patent
Park et al.

(10) Patent No.: US 6,833,637 B2
(45) Date of Patent: Dec. 21, 2004

(54) RECIPROCATING MOTOR

(75) Inventors: Kyeong-Bae Park, Gwangmyong (KR); Won-Hyun Jung, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/296,389

(22) PCT Filed: May 24, 2001

(86) PCT No.: PCT/KR01/00865
§ 371 (c)(1),
(2), (4) Date: Nov. 25, 2002

(87) PCT Pub. No.: WO02/080341
PCT Pub. Date: Oct. 10, 2002

(65) Prior Publication Data
US 2003/0160521 A1 Aug. 28, 2003

(30) Foreign Application Priority Data
Mar. 29, 2001 (KR) ........................................ 2001-16582

(51) Int. Cl.$^7$ .............................................. H92K 33/00
(52) U.S. Cl. ......................................... 310/12; 310/17
(58) Field of Search ............................ 310/12, 15, 17, 310/216, 217, 218, 36

(56) References Cited
U.S. PATENT DOCUMENTS 4,827,163 A  5/1989  Bhate et al.
4,883,999 A * 11/1989 Hendershot ................. 310/254
5,175,457 A  12/1992 Vincent
6,060,810 A *  5/2000 Lee et al. ..................... 310/12
6,184,597 B1  2/2001 Yamamoto et al.
6,326,706 B1 * 12/2001 Zhang ......................... 310/12
6,550,130 B2 *  4/2003 Itoh et al. ..................... 29/596
6,566,784 B1 *  5/2003 Hsu ........................... 310/254

FOREIGN PATENT DOCUMENTS

| JP | 61-106058 A | 5/1986 |
| JP | 07-500478 A | 1/1995 |
| JP | 2000-130326 A | 5/2000 |

* cited by examiner

Primary Examiner—Thanh Lam
Assistant Examiner—Judson H. Jones
(74) Attorney, Agent, or Firm—Birch, Stewart, Kolasch & Birch, LLP

(57) ABSTRACT

A reciprocating motor comprises a mover (400) including an opening unit formed as a ring with an opening on (110) its one side; a first stepped unit (120) in which the inner interval of the opening (110) unit is narrowed gradually toward the entrance; and a second stepped unit (130) continued with the first stepped unit (120) and forming the entrance of the opening unit. According to that, the length of the permanent magnet (420) is decided and the entrance width of the opening unit in which the winding coil (300) is located is reduced, thereby the amount of high price permanent magnet used is reduced, reciprocating movement of the mover getting out of the outer core is minimized, flux on the outer core and the inner core flows smoothly, and leakage of the flux is reduced so the function of the motor can be improved.

11 Claims, 6 Drawing Sheets

RECIPROCATING MOTOR

This application is the national phase under 35 U.S.C. §371 of PCT International Application No. PCT/KR01/00865 which has an International filing date of May 24, 2001, which designated the United States of America.

TECHNICAL FIELD

The present invention relates a reciprocating motor, and more particularly, to an improved reciprocating motor in which the width of an entrance of an opening where a winding coil is positioned, that is, the interpole distance is minimized, the space of the opening is maximized to reduce the amount of a pricy permanent magnet to be used, its output is heightened and its structure is simplified to be compact.

BACKGROUND ART

Generally, a motor is an instrument for converting an electric energy to a kinetic energy. There are two types of motors: one is a rotary motor which converts the electric energy to a rotational movement, and the other is a reciprocating motor which converts the electric energy to a linear reciprocal movement.

As a driving source, the motor is adopted for use to various fields. Especially, it is installed in almost every home appliance such as a refrigerator, an air conditioner, a washing machine or an electric fan. In case of the refrigerator and the air conditioner, the motor is not only used to rotate a ventilating fan, but also installed as a driving source at a compressor of a cooling cycle apparatus of the refrigerator and the air conditioner.

FIG. 1 is a drawing illustrating an example of a reciprocating motor in accordance with a conventional art.

As shown in FIG. 1, the reciprocating motor includes a cylindrical outer core 10 formed having a predetermined width and length, a cylindrical inner core 20 inserted in the outer core 10 with a predetermined space, a winding coil 30 coupled to the outer core 10 or the inner core 20, and a mover 40 movably inserted between the outer core 10 and the inner core 20.

FIG. 1 shows the structure that, the winding coil 30 is coupled to the outer core 10.

The outer core 10 has a 'U'-shaped section with a predetermined thickness, so that an opening 11 is formed in which the winding coil 30 is positioned. The 'U'-shaped outer core 10 forms a pass part 12 at which a flux flows, and a pole part 13 is formed at both ends of the pass part 12.

The inner core 20 has a section with a length corresponding to that of the outer core 10 and a predetermined width.

The outer core 10 and the inner core 20 are fixed at a separate frame (not shown) to constitute a stator (S).

The mover 40 includes a cylindrical magnet holder 41 inserted between the outer core 10 and the inner core 20 and a plurality of permanent magnets 42 combined at the outer circumferential surface of the magnet holder 41.

The operation of the reciprocating motor constructed as described above will now be explained.

FIG. 2 is a sectional view showing an operational state of the general reciprocating motor.

As shown in FIG. 2, first, when a current flows to the winding coil 30, a flux is formed around the winding coil 30 due to the current flowing along the winding coil 30. The flux flows to form a closed loop along the pass part 12 of the outer core and the inner core 20 which constitute the stator (S).

The interaction between the flux according to the current flowing along the coil 30 and the flux according to the permanent magnet 42 constituting the mover 40 makes the permanent magnet 42 to move in the axial direction.

When the direction of the current flowing to the winding coil 30 is changed, the direction of the flux formed at the pass part 12 of the outer core and the inner core 20 is accordingly changed, and thus, the permanent magnet 42 is moved in the opposite direction.

When the current is supplied to the permanent magnet 42 by changing its direction by turns, the permanent magnet 42 is moved linearly and reciprocally between the outer core 10 and the inner core 20. Accordingly, the mover 40 has a linear reciprocal driving force.

In the reciprocating motor, the length Lm of the permanent magnet 42 of the mover 40 is usually equivalent to the sum of the length Lp of the pole part and the interpole distance Lb.

Accordingly, since the length of the permanent magnet 42 is in proportion to the interpole distance Lb positioned at both sides of the opening 11, the shorter the interpole distance Lb is, the shorter Lm of the permanent magnet 42 becomes.

The length Lp of the pole part corresponds to the stroke, and the interpole distance Lb is equivalent to the width of the entrance of the opening 11.

The permanent magnet 42 of the mover 40 of the reciprocating motor costs much for its materials. Thus, in order to incur a less production cost, its amount to be used should be reduced. Especially, in case of a mass production, it is requisite to reduce a production unit cost.

In addition, in a case that the reciprocating motor is mounted in a different system, in order to occupy a less installation space, the reciprocating motor needs to be compact structurally.

Thus, it is critical to reduce the length of the high-priced permanent magnet 42 by reducing the interpole distance Lb to thereby reduce the cost of materials, prevent leakage of the magnetic flux and have a compact structure while obtaining the inner space of the opening as large as possible where the winding coil 30 is positioned.

In consideration of this, a structure as shown in FIG. 3 has been proposed.

FIG. 3 is a sectional view of a reciprocating motor proposed during a research and development of the inventor of the present invention.

With reference to FIG. 3, the structure includes a 'U'-shaped pass part 12, of the outer core 10 where the winding coil 30 is positioned, having a section with a predetermined thickness; a triangular extended part 14 protrusively extended in a triangle form at inner sides of both ends of the pass part 12, and a pole part 15 formed by the both ends of the pass part 12 and the triangular extended part 14.

An opening 16 where the winding coil 30 is positioned is formed by the inner side of the pass part 12 and the inner side of the triangular extended part 14. The distance between the inner ends of the triangular extended parts 14, that is, the interpole distance Lb' between the pole parts 15, forms the entrance of the opening 16.

However, with such a structure, if the triangular extended part 14 is enlarged to reduce the width of the entrance of the opening 16 in which the winding coil 30 is positioned, the inner space of the opening 16 becomes small, causing that the number of winding of the winding coil is reduced. On the other hand, if the triangular extended part 14 is made small to enlarge the inner space of the opening 16, the entrance of the opening 16 is widened, causing increase in the amount of the permanent magnet to be used.

Meanwhile, if the triangular extended part 14 is sharpened to maintain the inner space of the opening 16 and shorten the length of the entrance of the opening 16, that is, if the angle made as the inner face of the pass part 12 and the inner face of the triangular extended part 14 meet is almost perpendicular, the flow resistance of the flux flowing to the outer core 10 is rapidly increased, causing a damage to the flux.

In addition, with such a structure, when the mover 40 including the permanent magnet 42 is being linearly and reciprocally moved, the range in which the end portion of the mover 40 is protruded outwardly of the pole part 15 becomes wide. Thus, the space between the mover and other components should be distanced, causing a problem that its structure is enlarged.

DISCLOSURE OF THE INVENTION

Therefore, an object of the present invention is to provide a reciprocating motor in which the width of an entrance of an opening where a winding coil is positioned, that is, the interpole distance is minimized, the space of the opening is maximized to reduce an amount of a pricy permanent magnet to be used, its output is heightened and its structure is simplified to be compact.

In order to achieve the above objects, there is provided a reciprocating motor having an outer core, inner cores inserted at a predetermined distance from the outer core, a winding coil inserted into the outer core or the inner core and a mover provided with a permanent magnet and inserted to be linearly movable between the outer core and the inner core, including: a ring-shaped opening of which one side is opened so as for the winding coil to be positioned inside the core; a first step portion extendedly formed at the inner face of the opening such that the interval inside the opening becomes narrow as it comes to the entrance; and a second step portion having a predetermined width and length extendedly formed from the first step portion.

MODE FOR CARRYING OUT THE PREFERRED EMBODIMENTS

The present invention will now be described with reference to accompanying drawings.

Figure 1:
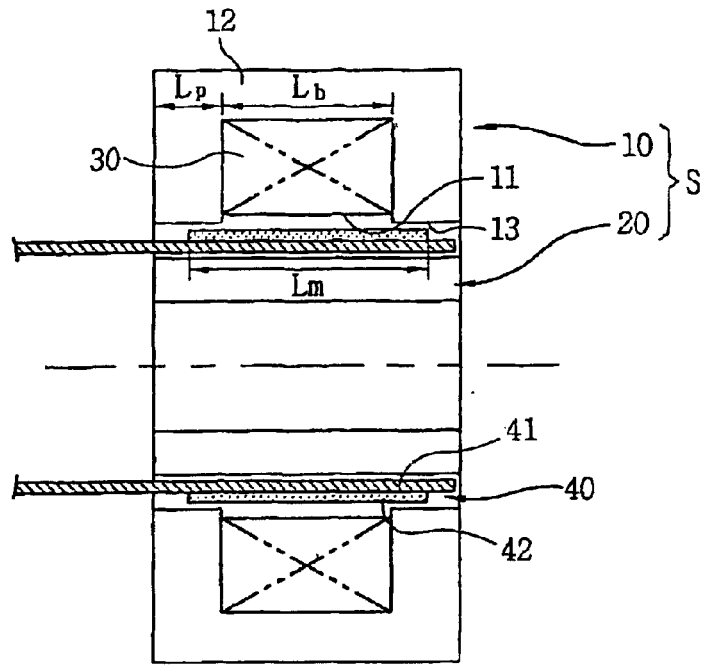
FIG. 1 is a sectional view showing a general reciprocating motor in accordance with a conventional art.
Figure 2:
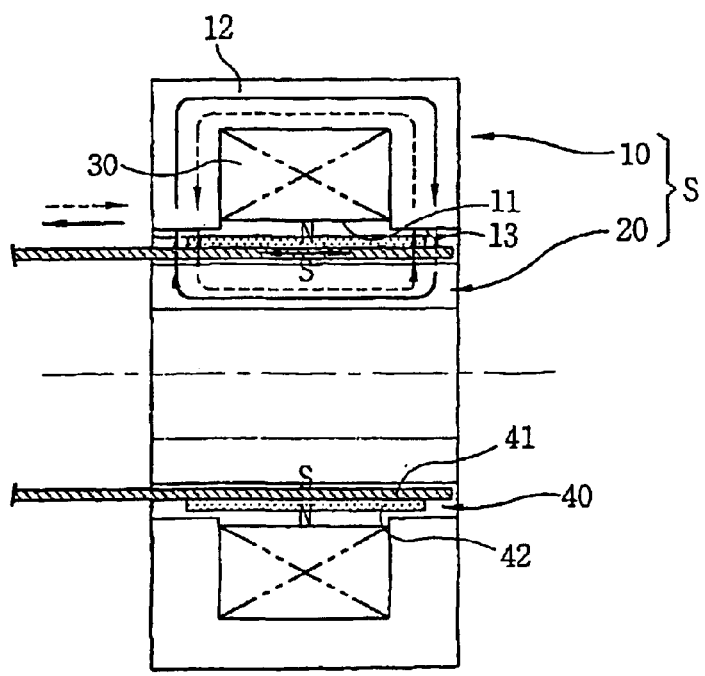
FIG. 2 is a sectional view showing an operational state of the general reciprocating motor in accordance with the conventional art.
Figure 3:
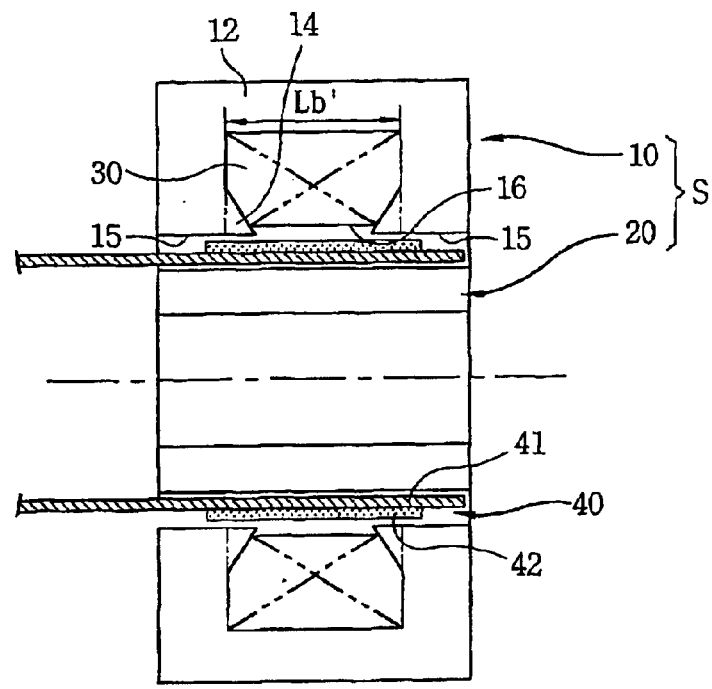
FIG. 3 is a sectional view of a reciprocating motor proposed during a research and development of the inventor of the present invention.
Figure 4:
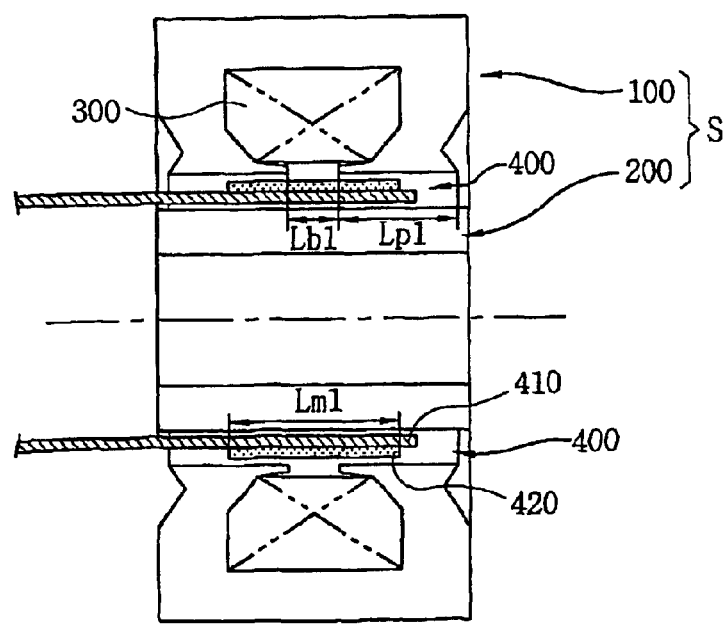
FIG. 4 is a sectional view of a reciprocating motor in accordance with one embodiment of the present invention.

FIG. 4 is a sectional view of a reciprocating motor in accordance with one embodiment of the present invention.

As shown in FIG. 4, similiarly to the reciprocating motor of the conventional art, the reciprocating motor of a preferred embodiment of the present invention includes a cylindrical outer core 100, an inner core 200 inserted at a certain distance from the outer core, a winding coil 300 combined with the outer core 100 and a mover 400 inserted to be linearly movable between the outer core 100 and the inner core 200. The winding coil 300 may be combined with the inner 200.

The outer core 100 and the inner core 200 are fixedly combined with a separate frame to constitute a stator (S).

Figure 5:
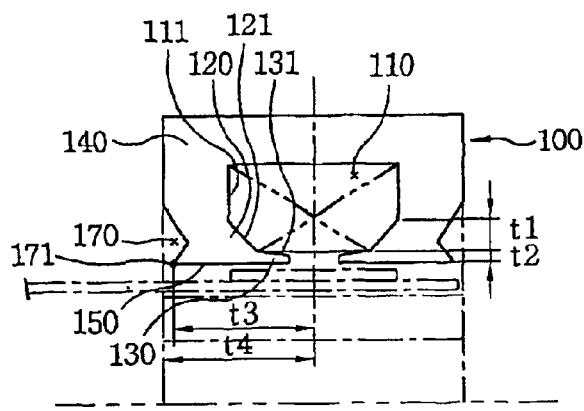
FIG. 5 is a sectional view of an outer core constituting the reciprocating motor in accordance with the preferred embodiment of the present invention.

As shown in FIG. 5, the outer core 100, where the winding coil 300 is combined, includes a ring-shaped opening 110 with one side opened, inner side of which the winding coil 300 is positioned a first step portion 120 extendedly formed at the inner side of the opening 110 in a manner that the inner space of the opening 110 becomes gradually narrow as it comes to the entrance of the opening 110, and a second step portion 130 extended from the first step portion 120, having a predetermined width and length to form an entrance of the opening 110.

The outer side of the opening 110, the first step portion 120 and the second step portion 130 forms a pass part 140 where a flux flows, and the end portion of the second step portion 130 forms a pole part 150 where a pole is formed.

The inner face of the first step portion 120 and the second step portion 130 are formed tilt to have a predetermined slope, and on the basis of the inner face 111 of the opening 110, the slope of the inner face 121 of the first step portion 120 is smaller than the slope of the inner face 131 of the second step portion 130.

That is, on the inner face 111 of the opening 110, the inner face 121 of the first step portion 120 is formed at a predetermined slope and the inner face 131 of the second step portion 130 is subsequently formed at a predetermined slope. The distance t2 of the second step portion 130 is shorter than the distance t1 of the first step portion 120.

Namely, the distances of the first and the second step portions 120 and 130 indicate the vertical distance (on FIG. 5).

Figure 6:
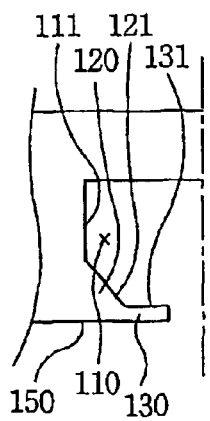
FIG. 6 is a sectional view showing a modification of the outer core constituting the reciprocating motor in accordance with the preferred embodiment of the present invention.

FIG. 6 shows modifications of the first and the second step portions 120 and 130.

As shown in FIG. 6, an inner face 121 of the first step portion 120 is tilt with a predetermined slope, and the inner face 131 of the second step portion 130 is formed at a right angle to the inner face 111 of the opening 110.

Figure 7:
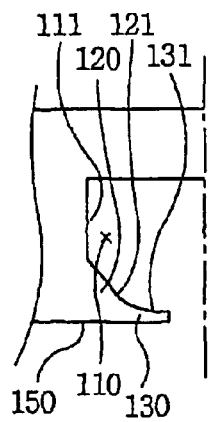
FIG. 7 is a sectional view showing a modification of the outer core constituting the reciprocating motor in accordance with the preferred embodiment of the present invention.

FIG. 7 shows a different modification of the second step portion 130. As shown in FIG. 7, the inner face 131 of the second step portion 130 is extendedly formed having a curved surface with a predetermined curvature.

Figure 8:
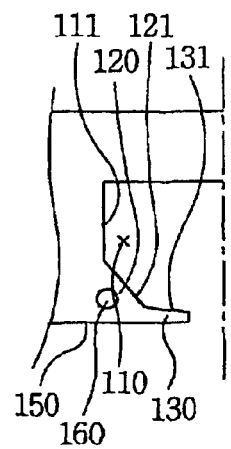
FIG. 8 is a sectional view showing a modification of the outer core constituting the reciprocating motor in accordance with the preferred embodiment of the present invention.

And, as shown in FIG. 8, a hole 160 may be formed at the first step portion 120 to prevent a magnetic saturation. In addition, a recess (not shown) in place of the hole 160 may be formed at the inner face of the first step portion 120.

With reference back to FIG. 5, a concave portion 170 with a predetermined depth is formed at the outer faces of the first and the second step portions 120 and 130.

The distance t3 from the corner 171 to the center of the opening 110 is shorter than the distance t4 from the outer face to the center of the opening 110.

That is, due to the formation of the concave portion 170, the distance t3 from the end of the pole 150 to the center of the opening 110 is smaller than the distance t4 from the outer face of the center of the opening 110.

Figure 9:
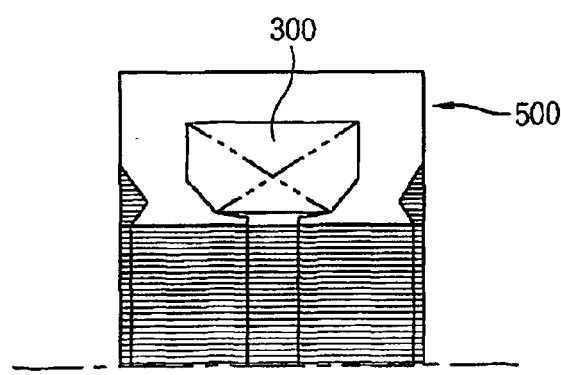
FIG. 9 is a front-sectional view showing a reciprocating motor in accordance with another embodiment of the present invention.
Figure 10:
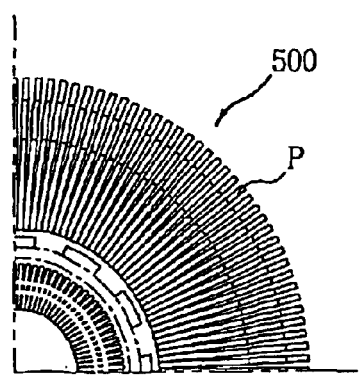
FIG. 10 is a side view showing a reciprocating motor in accordance with the preferred embodiment of the present invention.

In further embodiments, as shown in FIGS. 9 and 10, the outer core of the stator of the reciprocating motor 500 is formed by radially stacking a plurality of thin plates, making a cylindrical form. As shown in FIG. 10, the stacked thin plates constituting the stacked body core are formed in a 'U'-shape to thereby form the opening 510 in which the winding coil 300 is positioned.

Figure 11:
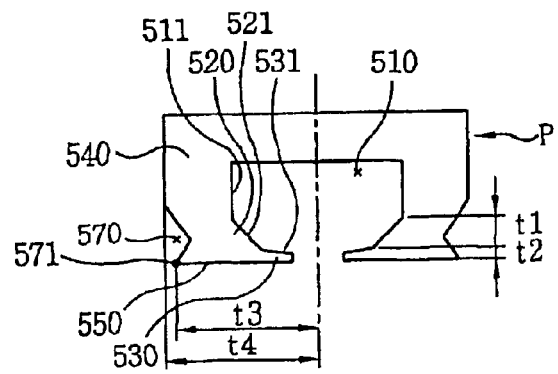
FIG. 11 is a front view showing a thin plate constituting the outer core of the reciprocating motor in accordance with the preferred embodiment of the present invention.

As shown in FIG. 11, in order to have a structure that the interval inside the opening 510 becomes narrow as it comes to the entrance, the first step portion 520 is formed extended from the inner face 511 of the opening 510, and the second step portion 530 is formed with a predetermined width and length extended from the first step portion 520, forming the entrance of the opening 510.

The 'U'-shaped portion forming the opening 510, the first step portion 520 and the second step portion 530 constitutes the pass portion 540 where the flux flows, and the end face of the second step portion 520 makes the pole portion 550 forming poles.

The inner faces 521 and 531 of the first and the second step portions 520 and 530 are tilted with a predetermined slope, and the slope of the inner face 521 of the first step portion 520 is smaller than that of the inner face 531 of the second step portion 530 on the basis of the inner face 511 of the opening 510.

That is, on the inner face 511 of the opening 510, the inner face 521 of the first step portion 520 is formed with a predetermined slope, and subsequent to the inner face 521 of the first step portion 520, the inner face 531 of the second step portion 530 is formed with a predetermined slope.

The distance t2 of the second step portion 530 is shorter than the distance t1 of the first step portion 520. Namely, the distances of the first and the second step portions 520 and 530 indicate the vertical distance (on FIG. 11).

In a modification of the first and the second step portions 520 and 530 as shown in FIG. 11, an inner face 521 of the first step portion 520 is tilt with a predetermined slope, and the inner face 531 of the second step portion 530 is formed at a right angle to the inner face 511 of the opening 510.

In a modification of the second step portion 530, the inner face 531 of the second step portion 530 may be formed to have a curved surface with a predetermined curvature.

Figure 13:
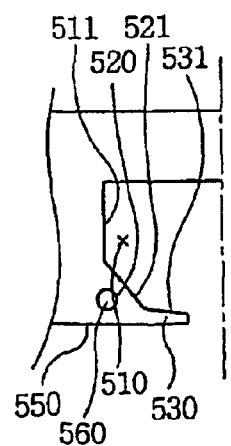
FIG. 13 is a front view showing a modification of the thin plate constituting the outer core of the reciprocating motor in accordance with the preferred embodiment of the present invention.
Figure 14:
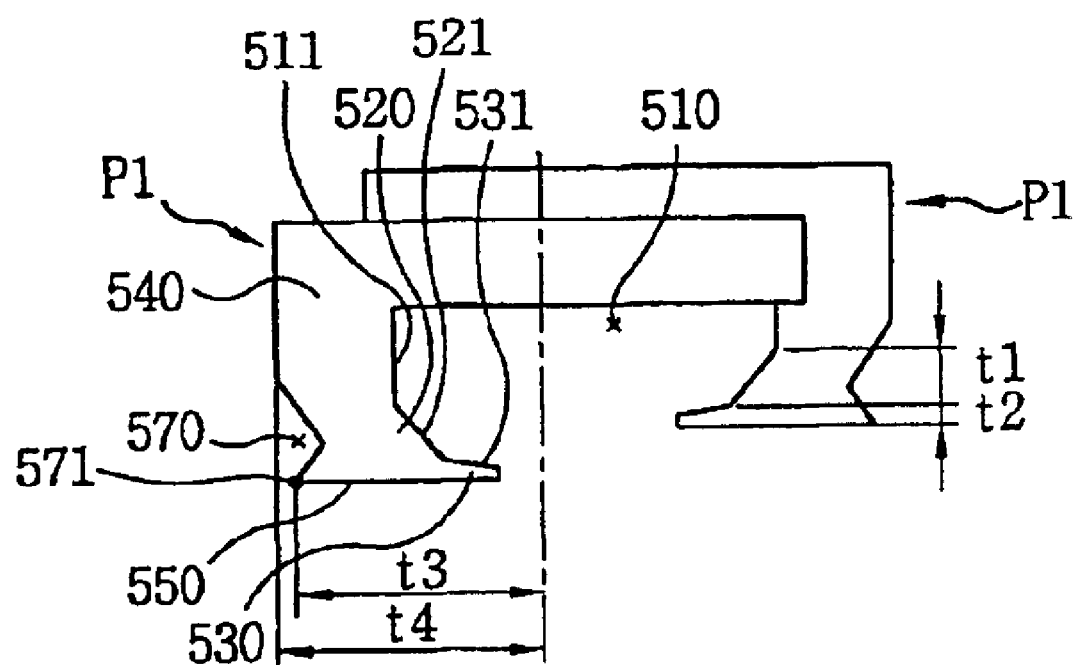
FIG. 14 is a perspective view showing a separable thin plate constituting the outer core of the reciprocating motor in accordance with another embodiment of the present invention.

And, as shown in FIG. 13, a hole 560 may be formed at the first step portion 520 to prevent a magnetic saturation. The hole 560 is formed as a through hole having a predetermined size. In addition, a concave groove (not shown) in place of the hole 560 may be formed at the inner face of the first step portion 520.

With reference back to FIG. 11, a concave portion 570 with a predetermined depth is formed at the outer faces of the first and the second step portions 520 and 530.

The distance t3 from the corner 571 to the center of the opening 510 is shorter than the distance t4 from the outer face to the center of the opening 510.

That is, due to the formation of the concave portion 570, the distance t3 from the end of the pole 550 to the center of the opening 510 is smaller than the distance t4 from the outer face of the center of the opening 510.

Figure 12:
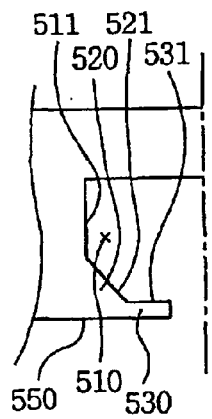
FIG. 12 is a front view showing a modification of the thin plate constituting the outer core of the reciprocating motor in accordance with the preferred embodiment of the present invention.

Referring to the formation of the stacked thin plates (P), as shown in FIG. 12, 'L'-shaped separate thin plates having the first step portion 520 and the second step portion 530 are alternately stacked for implementation.

In detail, the opening 510 in which a stacked body is formed by radially stacking the plurality of thin plates (P) to make a cylindrical form and the winding coil 300 is positioned inside the stacked body has the same shape as that of the opening 510 in which a stacked body is formed by radially and alternately stacking the separate thin plates (P1) to make a cylindrical form and the winding coil 300 is positioned inside the stacked body.

The winding coil 300 inserted into the openings 110 and 510 of the outer core 110 and 150 is formed by winding a coil for plural times.

And as shown in FIG. 4, the mover 400 inserted between the outer cores 100 and 500 and the inner core 200 has a predetermined thickness and includes a magnet holder 410 formed in a cylindrical shape and a plurality of permanent magnet 420 combined at the outer circumferential surface of the magnet holder 410 and positioned at the entrance of the opening of the outer cores 100 and 500.

The length Lm1 of the permanent magnet 420 is equivalent to the sum of the end of the second step portions 130 and 530 of the outer cores 100 and 500, that is, the length Lp1 of the pole parts 150 and 550, and the interpole distance Lb1.

The interpole distance is equivalent to the distance between the both pole parts 150 and 550, that is, between the inner corners of the second step portions 130 and 530.

The operational effect of the reciprocating motor will now be described.

First, when a current flows to the winding coil 300, a flux is formed around the winding coil 300. The flux flows and forms a closed loop along the pass part 140 having the first and the second step portions 120 and 130 of the outer core 100 and the inner core 200.

The interaction between the flux according to the current flowing along the winding coil 300 and the flux by the permanent magnet 420 of the mover 400 makes the permanent magnet 420 to move in the axial direction.

In this respect, if the direction of the current flowing along the winding coil is changed, the flux formed at the pass part 140 of the outer core and the inner core 200 is changed in its direction, rendering the permanent magnet 420 to be moved in the opposite direction.

In this manner, as the current is applied alternately by changing its direction, the permanent magnet 420 is linearly moved between the outer core 100 and the inner core 200. At this time, the front end of the permanent magnet 420 is linearly moved within the pole part 150.

Since the first and the second portions 120 and 130 are provided in the opening 110 in which the winding coil 300 is positioned to considerably reduce the width of the entrance of the opening 110, the length of the permanent magnet 420, which is determined depending on the width of the entrance of the opening 110 and the length of the pole part 150 which is positioned at both sides of the entrance, becomes short.

In addition, since the width of the entrance of the opening 110 is reduced while minimizing the reduction of the space for the winding coil 300, the number of windings of the winding coil 300 positioned in the opening 110 can be minimized.

The recess (not shown) for replacing the hole 560 may be formed at the inner face of the first step portion 520.

Moreover, since the width of the entrance of the opening 110 is shortened thanks to the first step portion 120 and the second step portion 130 and the pass part 140 for flowing the flux is smoothly formed, the flux smoothly flows.

Furthermore, since the magnetic saturation phenomenon occurs at the second step portion 130, the magnetic flux leakage can be minimized.

In addition, since the hole 160 is formed at the first and the second step portions 120 and 130, the magnetic saturation phenomenon is strengthened, so that the magnetic flux leakage can be more reduced.

Also, since the pole part 150 is lengthened thanks to the second step portion 130, the flux can flow smoothly. And, since both ends of the pole part 150 are positioned at the inner side than the outer face due to the concave portion 170 formed at the outer face of the outer core 100, so that the width of the outer core 100 can be reduced. In addition, since the distance that the mover 400 is protruded outwardly of the outer core 100 and the inner core 200 is reduced, its installation space can be reduced when being applied to a system.

As so far described, the reciprocating motor of the present invention has the many advantages.

For example, first, since the length of the permanent magnet of the mover is determined to be short and the width of the entrance of the opening in which the winding coil is positioned is reduced, the amount of the high-priced permanent magnet to be used can be reduced, so that its production cost can be reduced. Especially, it is profitable to a mass-production.

Secondly, since the flux flows smoothly at the outer core and the inner core and the leakage of the flux is reduced, the performance of the motor can be improved.

Thirdly, since the width of the outer core constituting the stator is reduced and the reciprocal movement of the mover getting out of the outer core is minimized, the size of the motor can be reduced and the motor installation space can be reduced.

As the present invention may be embodied in several forms without departing from the sprit or essential characteristics thereof, it should be also understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A reciprocating motor comprising:
    an outer core in which is provided an opening space for a winding coil;
    an inner core inserted at a predetermined distance from the outer core;
    a mover provided with a permanent magnet and inserted to be linearly movable between the outer core and the inner core;
    a plurality of first step portions respectively extending at a first angle from pole portions of the outer core; and
    a plurality of second step portions respectively extending at a second angle from each of the first step portions,
    wherein the surfaces of the first and second step portions face the opening space for the winding coil.

2. The reciprocating motor of claim 1, wherein the outer core is made of a stacked body of a plurality of thin plates which are radially stacked in a cylindrical form, wherein each thin plate comprises:
    an opening in which the winding coil is positioned, with one side opened;
    a first step portion extendedly formed from the inner face of the opening so that the interval of the opening becomes narrow as it comes toward the entrance; and
    a second step portion with a predetermined width and length extendedly formed from the first step portion, to form the entrance of the opening.

3. The reciprocating motor of claim 1 or 2, wherein the distance of the second step portion is shorter than the distance of the first step portion.

4. The reciprocating motor of claim 1 or 2, wherein the first step portion has a predetermined slope and the second step portion has an upper surface that is at a right angle to the inner face of the opening.

5. The reciprocating motor of claim 1 or 2, wherein the inner face of the second step portion is tilted to the inner face of the opening.

6. The reciprocating motor of claim 1 or 2, wherein the first and the second step portions are formed to have curved surfaces with a predetermined curvature, respectively.

7. The reciprocating motor of claim 1 or 2, wherein the first step portion has a recess with a predetermined size or a through hole.

8. The reciprocating motor of claim 1 or 2, wherein the second step portion has a recess with a predetermined size or a through hole.

9. The reciprocating motor of claim 1, wherein the first step portions and the second step portions extend inwardly of the opening space.

10. A reciprocating motor comprising:
    an outer core in which is provided an opening space for a winding coil;
    an inner core inserted at a predetermined distance from the outer core;
    a mover provided with a permanent magnet and inserted to be linearly movable between the outer core and the inner core;

a plurality of first step portions respectively extending at a first angle from pole portions of the outer core; and a plurality of second step portions respectively extending at a second angle from each of the first step portions, wherein the slope of the first step portion is smaller than the slope of the second step portion.

11. A reciprocating motor comprising:

an outer core;

an inner core inserted at a predetermined distance from the outer core;

a winding coil inserted into the outer core or the inner core;

a mover provided with a permanent magnet and inserted to be linearly movable between the outer core and the inner core;

a ring-shaped opening of which one side is opened so as for the winding coil to be positioned inside the outer core;

a first step portion extendedly formed at the inner face of the opening such that the interval of the inner face of the opening becomes narrow as it comes to the entrance; and a second step portion having a predetermined width and length extendedly formed from the first step portion, wherein a concave portion is formed with a predetermined depth at the outer face of the first and the second step portions and the distance from the corner of the concave portion to the center of the opening is shorter than the distance from the outer face to the center of the opening.

* * * * *